(12) United States Patent
Dame

(10) Patent No.: US 9,420,314 B1
(45) Date of Patent: Aug. 16, 2016

(54) DISTRIBUTION OF IN-FLIGHT ENTERTAINMENT CONTENT TO PORTABLE ELECTRONIC DEVICES

(71) Applicant: The Boeing Company, Chicago, IL (US)

(72) Inventor: Stephen Gregory Dame, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/706,276

(22) Filed: May 7, 2015

(51) Int. Cl.
*H04N 21/214* (2011.01)
(52) U.S. Cl.
CPC .................................. *H04N 21/2146* (2013.01)
(58) Field of Classification Search
CPC combination set(s) only.
See application file for complete search history.

(56) References Cited

U.S. PATENT DOCUMENTS

| 8,170,535 B1 * | 5/2012 | Lopes | H04N 21/2146 455/414.1 |
| 2009/0083805 A1 * | 3/2009 | Sizelove | G06F 1/1626 725/76 |
| 2013/0063612 A1 * | 3/2013 | Royster | H04N 21/2146 348/207.99 |

FOREIGN PATENT DOCUMENTS

WO 2006065381 A2 6/2006

OTHER PUBLICATIONS

Panasonic's Jazz Seating Concept Jazzes-Up Economy, http://apex.aero/2015/04/panasonic-jazz-seating-concept-jazzes-up-economy, © 2105 APEX.

* cited by examiner

*Primary Examiner* — Mulugeta Mengesha
(74) *Attorney, Agent, or Firm* — Duft Bornsen & Fettig LLP

(57) ABSTRACT

Embodiments herein provide for In-Flight Entertainment (IFE) content distribution onboard an aircraft to Personal Electronic Devices (PEDs) of passengers over Universal Serial Bus (USB). One embodiment comprises system that includes a media server disposed within the aircraft. The media server provides IFE content streams to the PEDs of passengers. The system further includes an Ethernet network that is electrically coupled to the media server, and a plurality of IFE distribution units that are disposed within the aircraft. At least one of the IFE distribution units includes an Ethernet interface that is electrically coupled to the Ethernet network, a USB port located proximate to a seat within the aircraft, and a controller. The controller is electrically coupled to the Ethernet interface and the USB port, and converts the IFE content streams from the media server from Ethernet frames to USB frames for presentation to the PEDs.

16 Claims, 6 Drawing Sheets

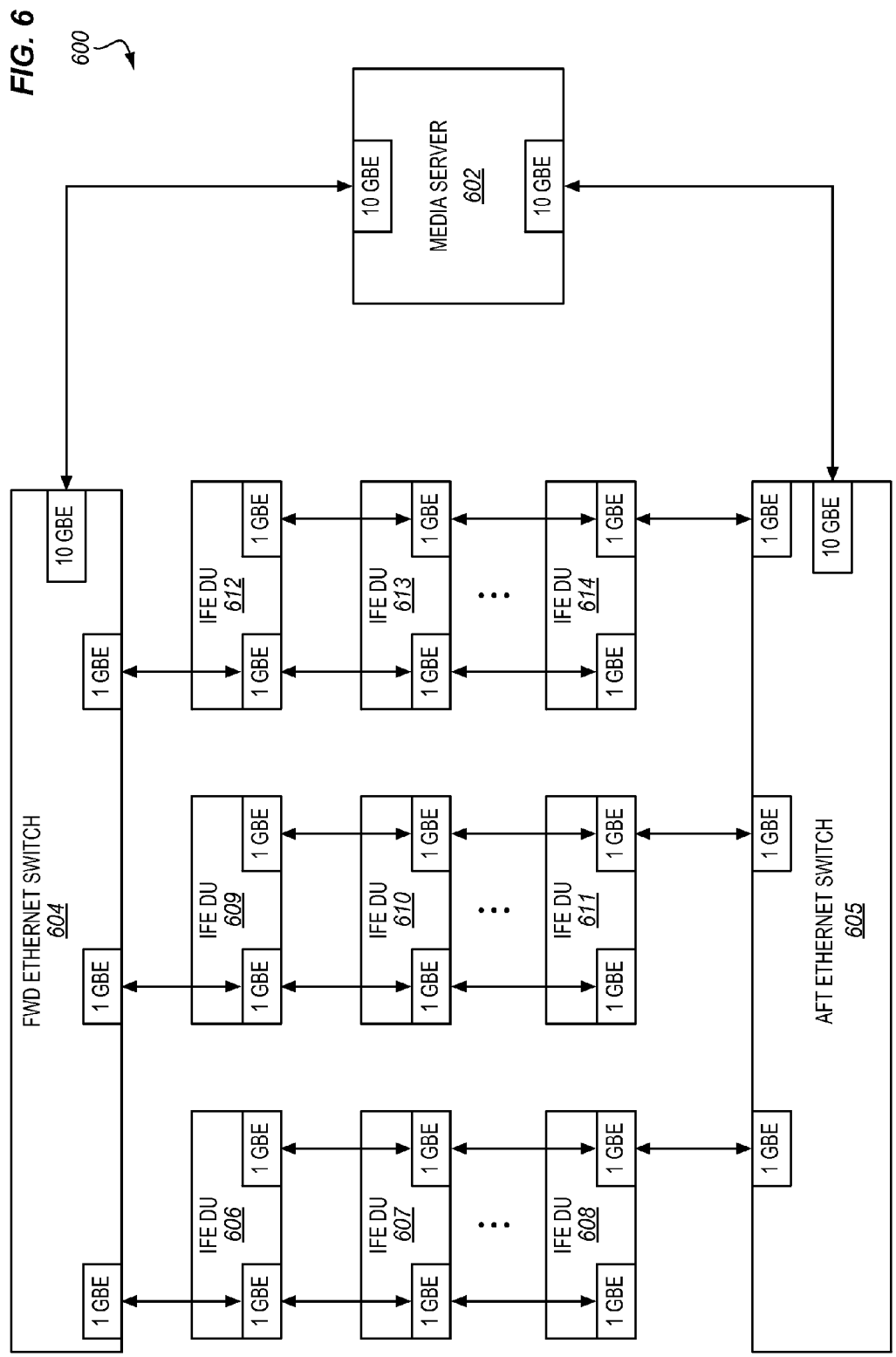

DISTRIBUTION OF IN-FLIGHT ENTERTAINMENT CONTENT TO PORTABLE ELECTRONIC DEVICES

FIELD

This disclosure relates to the field of aircraft data networks, and in particular, to interfacing aircraft data networks with portable electronic devices.

BACKGROUND

Aircraft passengers have an expectation that they will be able to use their Portable Electronic Devices (PEDs) during flight. Some examples of PEDs include smart phones, tablets, portable computers, etc. Passengers may utilize their PEDs to access the various In-Flight Entertainment (IFE) options (e.g., movies, television shows, music, the Internet, etc.) that may be provided by an aircraft data network.

PEDs interface with the aircraft data network using a Wireless Local Area Network (WLAN). One example of a WLAN includes Wi-Fi. Wi-Fi commonly utilizes channels in the 2.4 GigaHertz (GHz) frequency band and/or in the 5 GHz frequency band. 2.4 GHz Wi-Fi provides a 20 MegaHertz (MHz) bandwidth per channel, with 11 total channels available worldwide due to per-country limitations. 5 GHz Wi-Fi provides a 20 MHz, 40 MHz, 80 MHz, or 160 MHz bandwidth per channel, with 18 total channels available (mostly) worldwide due to per-country limitations.

Since WLANs depend upon the use of a limited radio bandwidth across a finite number of possible channels, the possibility exists onboard the aircraft that bandwidth limitations will result in a poor quality of service for the passengers. For example, a wide body aircraft such as the 777 may have more than 400 passengers, with each passenger possibly having a PED in use for accessing the IFE options onboard the aircraft. To stream a movie or television show at 1080p, a WLAN implementation may be tasked with transporting about 5-6 million bits per second (Mbps) for each stream, depending on the codec that is in use (e.g., H.264 in this example). Multiplied across the number of passengers in the aircraft, the 2 billion bits per second (Gbps) data rate across the WLAN implementation on the 777 may be impractical. This process is aggravated at even higher resolutions streams. At quad-HD (4K streams), the per stream data rate increases to 18-20 Mbps, depending on the codec that is in use (e.g., H.264 in this example). Multiplied across the number of passengers in the aircraft, the 7.2 Gbps data rate across the WLAN implementation on the 777 is likely to be even more impractical.

Although new codecs may be capable of reducing the WLAN data rate requirements (e.g., H.265 may be capable of reducing the WLAN data rate by as much as 50%), even this reduction may be insufficient to overcome the inherent bandwidth and channel limitations that are present in aircraft WLAN implementations.

Thus, present aircraft WLAN implementations may be inadequate to provide the quality of service that aircraft passengers have come to expect onboard the aircraft for IFE content delivery.

SUMMARY

Embodiments herein provide for In-Flight Entertainment (IFE) content distribution onboard an aircraft to Personal Electronic Devices (PEDs) of passengers over Universal Serial Bus (USB). A plurality of IFE distribution units are located onboard the aircraft. The IFE distribution units receive IFE content streams from a media server over an Ethernet distribution network, and convert the IFE content streams from Ethernet frames to USB frames. The USB frames are provided to the PEDs over USB ports that are located proximate to seats onboard the aircraft.

One embodiment comprises a system that includes a media server disposed within an aircraft. The media server provides IFE content streams to PEDs of passengers. The system further includes an Ethernet network that is electrically coupled to the media server, and a plurality of IFE distribution units that are disposed within the aircraft. At least one of the IFE distribution units comprises an Ethernet interface that is electrically coupled to the Ethernet network, a USB port located proximate to a seat within the aircraft, and a controller. The controller is electrically coupled to the Ethernet interface and the USB port, and converts the IFE content streams from the media server from Ethernet frames to USB frames for presentation to the PEDs.

Another embodiment comprises a method operable in an aircraft In-Flight Entertainment (IFE) system for providing IFE content streams to Personal Electronic Devices (PEDs) of passengers. The IFE system comprises a media server disposed within the aircraft, an Ethernet network electrically coupled to the media server, and a plurality of IFE distribution units that are disposed within the aircraft. The method comprises detecting, by a controller of an IFE distribution unit, that a PED has been connected to a USB port of the IFE distribution unit that is proximate to a seat in the aircraft. The method further comprises receiving, by the controller, a request from the PED for an IFE content stream from the media server, and converting, by the controller, the request from USB frames to Ethernet frames. The method further comprises providing, by the controller, the request to the media server utilizing an Ethernet interface of the IFE distribution unit that is electrically coupled to the Ethernet network.

Another embodiment comprises a system that is configured to provide IFE content streams to Personal Electronic Devices (PEDs) of passengers. The system comprises a media server disposed within the aircraft, an Ethernet switch disposed within the aircraft, and a plurality of IFE distribution units disposed within the aircraft. The Ethernet switch includes a first Ethernet interface that is electrically coupled to the media server and a plurality of second Ethernet interfaces. At least one of the IFE distribution units includes an Ethernet interface coupled to one of the second Ethernet interfaces of the Ethernet switch, a plurality of USB ports located proximate to seats onboard the aircraft, and a controller. The USB ports are electrically coupled to the PEDs of the passengers, and the controller is electrically coupled to the Ethernet interface of the IFE distribution unit and the USB ports. The controller converts IFE content streams from the media server from Ethernet frames to USB frames for presentation to the PEDs.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 6 is a block diagram of an IFE content distribution architecture in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
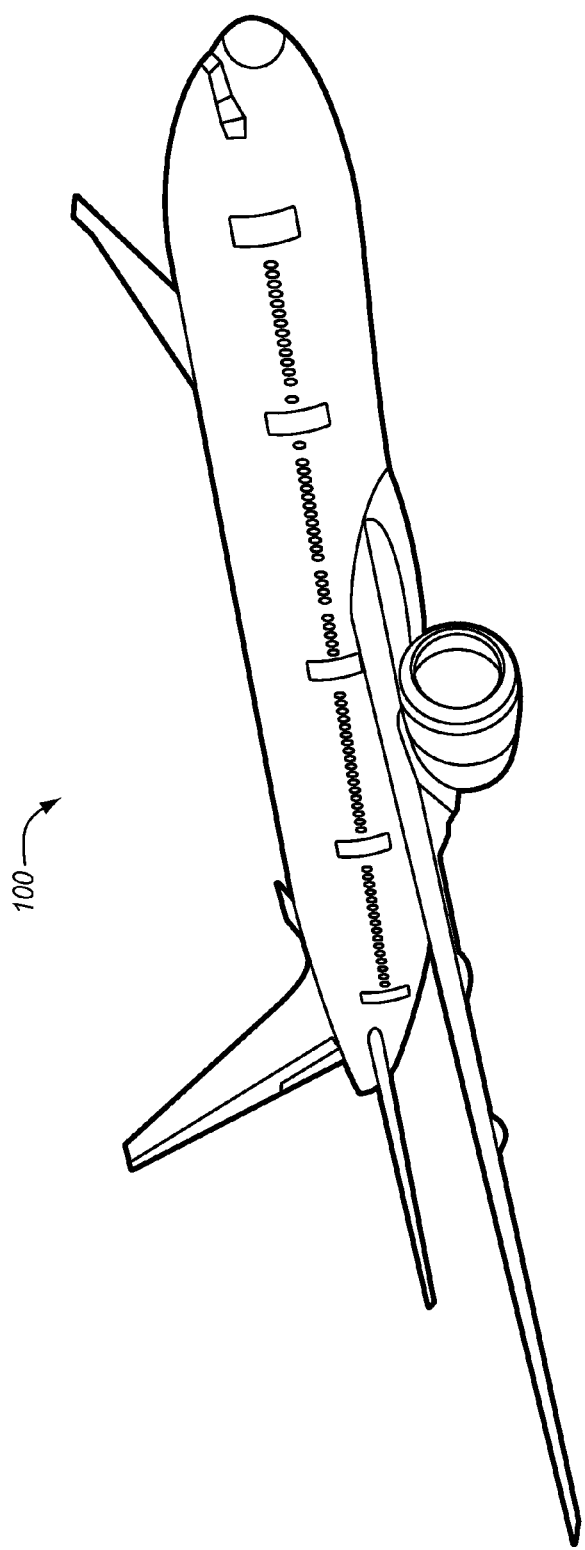
FIG. 1 illustrates an aircraft implementing an IFE content distribution system in an exemplary embodiment.

FIG. 1 illustrates an aircraft 100 implementing an IFE content distribution system in an exemplary embodiment. In this embodiment, aircraft 100 includes a media server (not shown in FIG. 1), which provides IFE content streams to PED (not shown in FIG. 1) utilizing USB connections. Since the PEDs are connected to the IFE content distribution system utilizing USB, the IFE content distribution system is capable of supplying high data rate content to passengers onboard aircraft 100 without relying on Wi-Fi, which has limited data transport capabilities. This enables the IFE content distribution system onboard aircraft 100 to provide a high level of service quality, and therefore, the IFE experiences that passengers have is improved.

Figure 2:
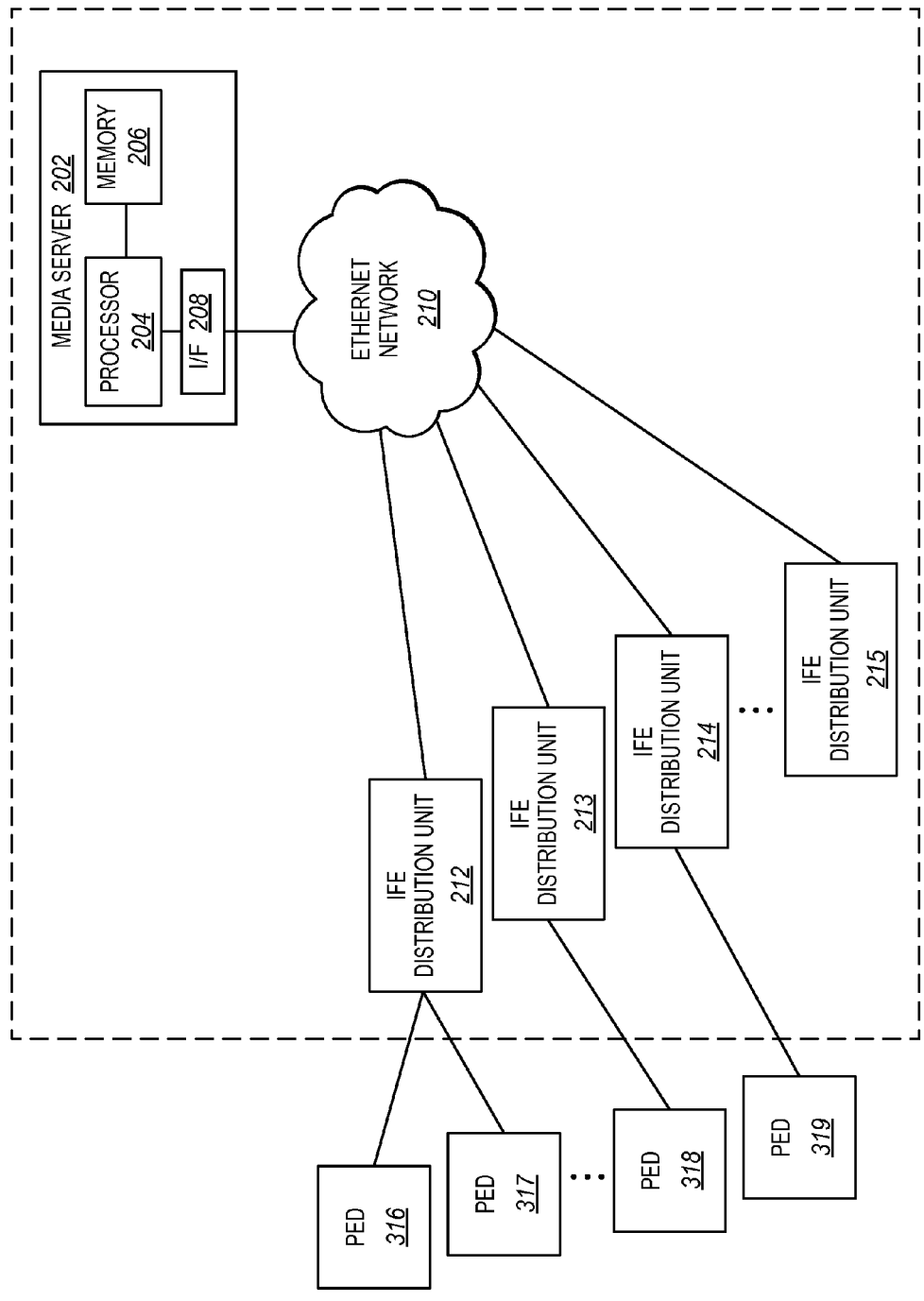
FIG. 2 is a block diagram of an IFE content distribution system for the aircraft of FIG. 1 in an exemplary embodiment.

FIG. 2 is a block diagram of an IFE content distribution system 200 for aircraft 100 of FIG. 1 in an exemplary embodiment. In this embodiment, system 200 includes a media server 202 onboard aircraft 100 that is capable of distributing IFE content to PEDs 316-319 (e.g., tablets, smart phones, portable computers, etc.) of passengers utilizing USB connections that are present at IFE distribution units 212-215. Although only four PEDs 316-319 are illustrated in FIG. 2, system 200 is capable of distributing IFE content to any number of PEDs as desired.

In this embodiment, IFE distribution units 212-215 are electrically coupled to media server 202 via an Ethernet network 210. Although only four IFE distribution units 212-215 are illustrated 200, aircraft 100 may have more or fewer IFE distribution units 212-215 as a matter of design choice. For example, aircraft 100 may include a plurality of IFE distribution units that are located proximate to each seat or groups of seats onboard aircraft 100. The particular functionality of IFE distribution units 211-215 will be discussed later.

Media server 202 may distribute live content and/or pre-recorded content. For example, to provide live content, media server 202 may be communicatively coupled with one or more satellites (not shown), which allows media server 202 to re-transmit content received from the satellite(s) (e.g., movies, television shows, advertisements, etc.) in real-time or near real-time to passengers onboard aircraft 100. To provide pre-recorded content to passengers onboard aircraft 100, media server may retrieve pre-recorded content (e.g., movies, television shows, advertisements, etc.) from a memory 206. Media server 202 may also provide access to the Internet to passengers onboard aircraft 100 utilizing a bi-directional communication link to one or more satellites.

While the specific hardware implementation of media server 202 is subject to design choices, one particular embodiment may include one or more processors 204 coupled with memory 206. Processor 204 includes any hardware device that is able to perform functions. For example, processor 204 may provide IFE content streams to Ethernet network 210 by packetizing or assembling IFE content into Ethernet frames. Processor 204 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc.

Memory 206 includes any hardware device that is able to store data. For instance, memory 206 may store IFE content. Memory 206 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

In this embodiment, media server 202 also includes an Ethernet interface (I/F) 208 which electrically couples media server 202 to Ethernet network 202. I/F 208 includes any component, system, or device that is able to provide Ethernet signaling and Ethernet frame processing capabilities to media server 202.

Ethernet network 210 may include one or more Ethernet switches, not shown, which route Ethernet frames between Ethernet enabled devices (e.g., IFE distribution units 212-215 and media server 202). For instance, if IFE distribution units 212-215 are distributed across different seat groups onboard aircraft 100, then Ethernet network 210 may be implemented with one or more Ethernet switches that distributes Ethernet network 210 along columns of seats or groups of columns of seats onboard aircraft 100. Additional Ethernet switches may provide additional bandwidth capability to a particular IFE distribution unit 212-215 and/or may be wired to provide redundancy to a particular IFE distribution unit 212-215. Although only one signaling path is illustrated between Ethernet network 210 and IFE distribution units 212-215, a plurality of signaling paths may be provided to improve the data rate capabilities between media server 202 and IFE distribution units 212-215 and/or to provide redundancy in cases where a possible failure in an Ethernet switch utilized to implement Ethernet network 210 fails.

In this embodiment, system 200 is capable of providing IFE content streams to PEDs 316-319 over USB connections that are present at IFE distribution units 212-215. The IFE content streams originate at media server 202, which encapsulates the IFE content data packets within Ethernet frames at I/F 208. The Ethernet frames for the IFE content streams are routed through Ethernet network 210 to IFE distribution units 212-215, which convert Ethernet frames for the IFE content streams to USB frames for PEDs 316-319.

Figure 3:
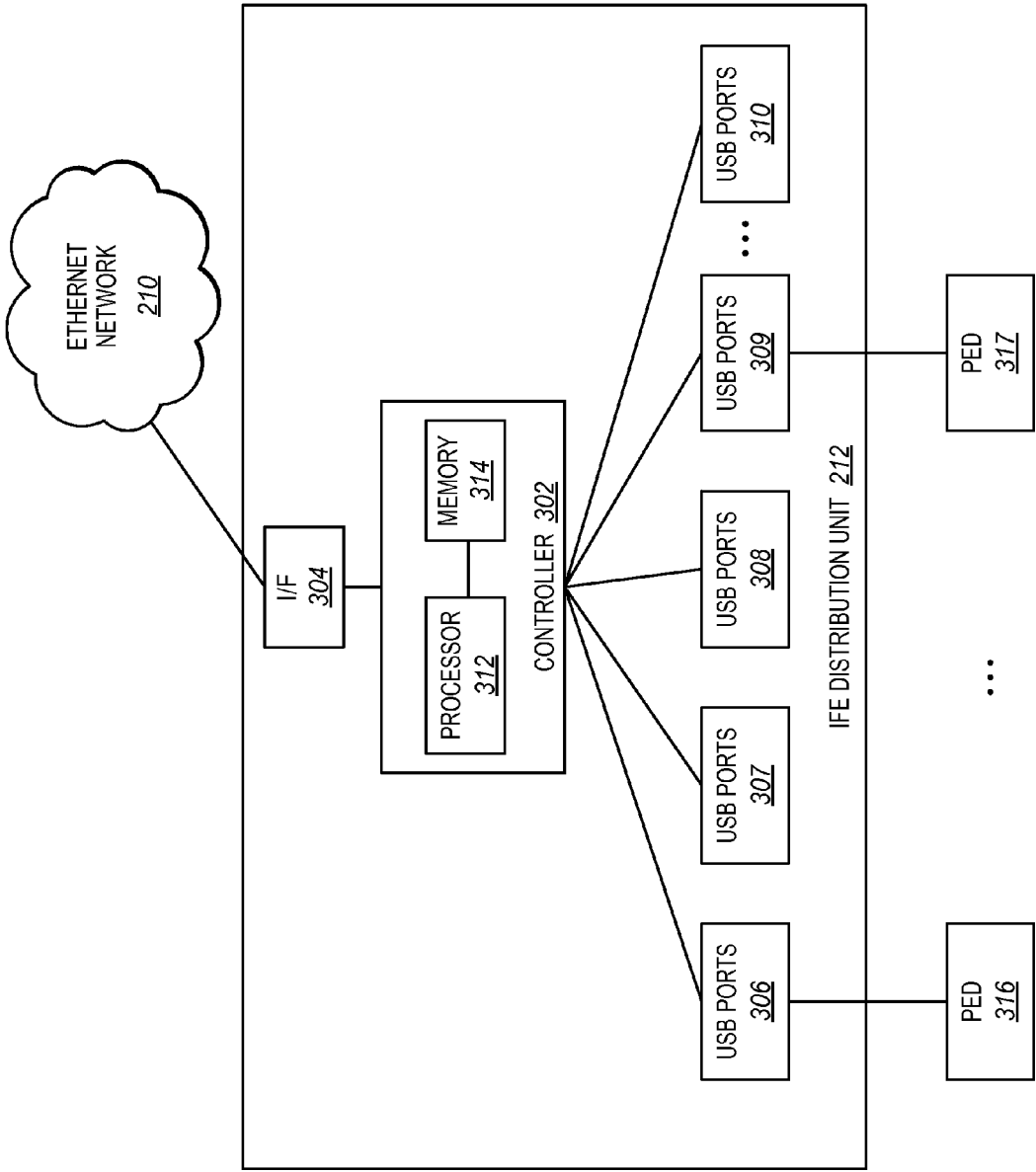
FIG. 3 is a block diagram of the IFE distribution units of FIG. 2 in an exemplary embodiment.

FIG. 3 is a block diagram of IFE distribution unit 212 of FIG. 2 in an exemplary embodiment. Although only IFE distribution unit 212 is illustrated in FIG. 3, the structure and functionality described herein for IFE distribution unit 212 may also apply to other IFE distribution units that may be present onboard aircraft 100 (e.g., IFE distribution units 213-215 shown in FIG. 2).

In this embodiment, IFE distribution unit 212 includes a controller 302 that is electrically coupled to an Ethernet interface (I/F) 304 and one or more USB ports 306-310. In this embodiment, I/F 304 is electrically coupled to Ethernet network 210, and is capable of communicating via Ethernet frames with media server 202 via I/F 208. I/F 304 of IFE distribution unit 212 includes any component, system, or device that is able to provide Ethernet signaling and Ethernet frame processing capabilities to IFE distribution unit 212. Controller 302 translates or converts between Ethernet frames received/transmitted at I/F 304 and USB frames received/transmitted at USB ports 306-310.

USB ports 306-310 may support USB 1.0, USB 2.0, USB 3.0, or later implementations of USB as a matter of design choice. USB 1.0 supports a data transfer rate of up to 12 Mbps, USB 2.0 supports a data transfer rate of up to 480 Mbps, and USB 3.0 supports a data transfer rate of up to 5 Gbps.

For purposes of discussion only, USB port 306 of IFE distribution unit 212 is electrically coupled with PED 316, and USB port 309 of IFE distribution unit 212 is electrically coupled with PED 317. Since the particular standard of USB (e.g., 1.0, 2.0, and/or 3.0) implemented in IFE distribution unit 212 is a matter of design choice, the maximum data rate that may be possible between media server 202 and PEDs 316-317 may vary based on the implementation. However, even at 12 Mbps for USB 1.0, an IFE content stream (e.g., at 1080p) encoded with H.264 is easily handled by a 12 Mbps interface to PEDs 316-317. However, higher resolution content streams and/or different codecs may make higher interface rates (e.g., using USB 2.0 and/or USB 3.0) desirable to provide additional bandwidth between media server 202 and PEDs 316-317.

While the specific hardware implementation of controller 302 is subject to design choices, one particular embodiment may include one or more processors 312 coupled with a memory 314. Processor 312 includes any hardware device that is able to perform functions. For example, processor 312 may operate to convert Ethernet frames received by I/F 304 to USB frames for transmission on USB ports 306-310, and to convert USB frames received by USB ports 306-310 to Ethernet frames for transmission by I/F 304. Processor 312 may include one or more Central Processing Units (CPU), microprocessors, Digital Signal Processors (DSPs), Application-specific Integrated Circuits (ASICs), etc. Some examples of processors include Intel® Core™ processors, Advanced Reduced Instruction Set Computing (RISC) Machines (ARM®) processors, etc.

Memory 314 includes any hardware device that is able to store data. For instance, memory 206 may store USB frames and/or USB data packets that are extracted from USB frames. In like manner, memory 206 may store Ethernet frames and/or Ethernet data packets that are extracted from Ethernet frames. Memory 314 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

For purposes of discussion, assume that aircraft 100 is in flight and that the flight crew has authorized that PEDs may be used by passengers onboard aircraft 100. One of the passengers powers up PED 316, and connects PED 316 to USB port 306 of IFE distribution unit 212.

Figure 4:
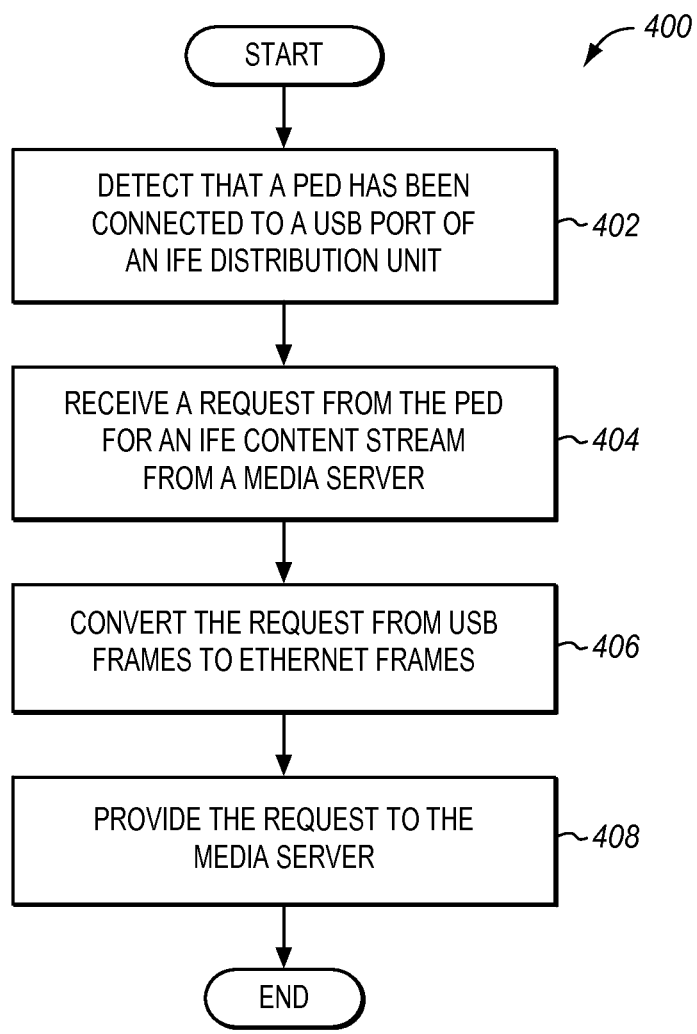
FIG. 4 is a flow chart illustrating a method of providing IFE content streams to PEDs of passengers in an exemplary embodiment.

FIG. 4 is a flow chart illustrating a method 400 of providing IFE content streams to PEDs of passengers in an exemplary embodiment. The steps of the flow charts described herein may include other steps that are not shown. Also, the steps of the flow charts described herein may be performed in an alternate order.

In response to the passenger connecting PED 316 to USB port 306, processor 312 (see FIG. 3) detects this activity (see step 402 of FIG. 4). A USB interface may include 4 wires. Power, Ground, Data Plus (USBDP) and Data Minus (USBDM). A resistor may also couple both USBDP and USBDM to Ground. When PED 316 is connected to USB port 306, processor 317 may use changes in the signaling of USBDP and USBDM to detect the connection. In response to detecting the connection, processor 312 may perform a speed negotiation with PED 316. The particulars of the speed negotiation depend upon the supported version of USB at USB ports 306-310.

Using PED 316, the passenger may browse the available IFE content that is available onboard aircraft 100. To do so, PED 316 may execute an application that queries media server 202 for a list of the available IFE content. In addition or instead of, the passenger may utilize a web browser to load a web page provided by media server 202 that lists the available IFE content. The IFE content may include movies, television shows, information about access to the Internet, music, etc. The passenger may then utilize PED 316 to make a selection for IFE content. PED 316 generates the request and transmits the request to IFE distribution unit 212 over USB port 306.

Processor 312 detects the request for an IFE content stream from PED 306 (see step 404). For instance, processor 312 may analyze USB frames arriving at USB port 306 to identify tags or other USB data packets in the USB frames that indicate an IFE content request from PED 316. In response to the request, processor 312 converts the request from USB frames to Ethernet frames (see step 406). Processor 312 may store USB frames and or USB packet data extracted from the USB frames in memory 314, and assemble Ethernet frames from the USB frames and/or USB data packets. Processor 312 may also generate new Ethernet frames in response to detecting the request, if the type of signaling data used to indicate the request over USB from PED 316 is different than the type of signaling data used to indicate the request over Ethernet to media server 202. Processor 312 provides the request to media server 202 by forwarding and/or transmitting Ethernet frames to media server 202 via I/F 304 (see step 408).

Ethernet network 210 routes the Ethernet frames to media server 202, which receives the Ethernet frames at I/F 208. In response to the request, processor 204 of media server 202 packetizes the requested IFE content into Ethernet data packets, and assembles Ethernet frames at I/F 208. The Ethernet frames are transmitted to Ethernet network 210. Ethernet network 210 routes the Ethernet frames to I/F 304 of IFE distribution unit 212 (e.g., using a Media Access Control (MAC) address of I/F 304 that is located in the Ethernet frames.

Figure 5:
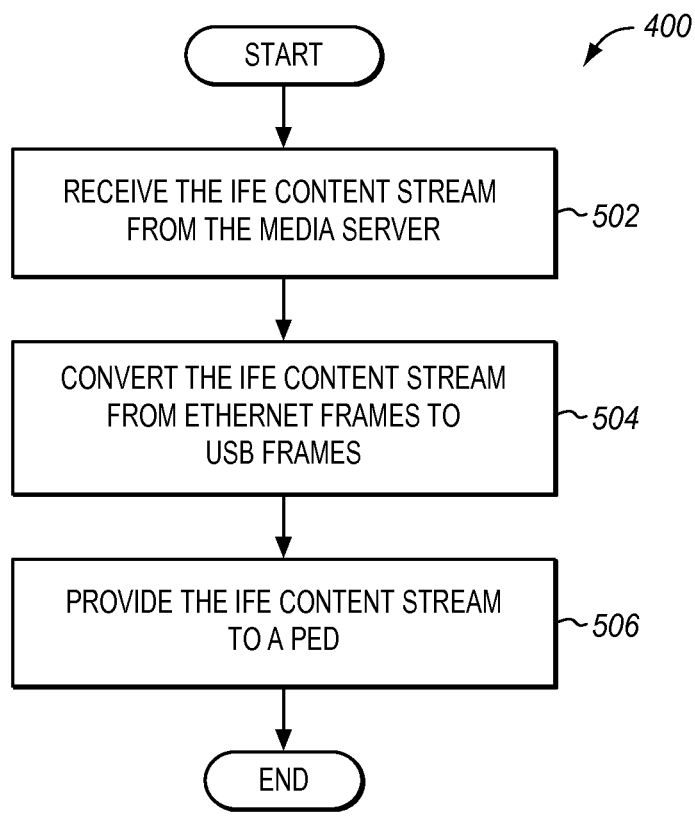
FIG. 5 is a flow chart illustrating additional details for the method of FIG. 4 in an exemplary embodiment.

FIG. 5 is a flow chart illustrating additional details for method 400 of FIG. 4 in an exemplary embodiment. As Ethernet frames for the IFE content stream begin to arrive at I/F 304, processor 312 of IFE distribution unit 212 detects this (see step 502 of FIG. 5). Processor 312 may temporarily store the Ethernet frames in memory 314, and begin converting the Ethernet Frames to USB Frames (see step 504). To do so, processor 312 may strip out data packets from the Ethernet frames, and assembles USB frames based on the data packets. In some cases, differences in the size of data packets in a Ethernet frame versus data packets in a USB frame may entail some buffering of the IFE content stream in memory 314 prior to assembling a USB frame for PED 316. In response to assembling a USB frame, processor 312 provides the USB frame to USB port 306, which is then transmitted to PED 316 (see step 506). This process continues in real-time or near real-time as Ethernet frames arrive at I/F 304 from media server 202 and processor 312 assembles USB frames for PED 316.

In some cases, situations may arise at IFE distribution unit 212 when multiple PEDs are receiving IFE content streams provided by IFE distribution unit 212. For instance, PED 317 may be connected to USB port 309, and request an IFE content stream from media server 202. In this case, both PED 316 and PED 317 receive IFE content streams from media server 202. However, it is typical for I/F 304 to be assigned a single MAC address, which is used as the destination address for Ethernet frames sent by media server 202 to IFE distribution unit 212. In this case, Ethernet frames that arrive at I/F 304 may be for PED 316 or for PED 317, since both Ethernet frames may include a single MAC address destination (e.g., the MAC address of I/F 304). Thus, some mechanism may exist to determine whether the received Ethernet frames at I/F 304 should be routed to either USB port 306 or USB port 309.

One solution is to use unique addresses that are associated with devices that are connected to USB ports 306-310. For instance, when PED 316 is connected, processor 312 assigns an address to PED 316 and/or USB port 306 that can be used to link incoming Ethernet frames at I/F 304 with PED 316. If PED 316 requests an IFE content stream from media server 202, then processor 312 provides the address for PED 316 and/or USB port 306 for PED 316 to media server 202. This allows processor 204 of media server 202 to include the address within Ethernet frames sent to I/F 304 of IFE distribution unit 212. When an Ethernet frame arrives at I/F 304, processor 312 of IFE distribution unit 212 can determine whether the Ethernet frame is for PED 316 or for PED 317.

In like manner, when PED 317 is connected, processor 312 assigns a different address to PED 317 and/or USB port 309 that can be used to link incoming Ethernet frames at I/F 304 with PED 317. If PED 317 requests an IFE content stream from media server 202, processor 312 provides the address for PED 317 and/or USB port 309 to media server 202. This allows processor 204 of media server 202 to include the address for PED 317 within Ethernet frames sent to I/F 304 of IFE distribution unit 212. When an Ethernet frame arrives at I/F 304, processor 312 of IFE distribution unit 212 can determine whether the Ethernet frame is for PED 316 or for PED 317 based on the differences in the addresses in the Ethernet frames.

In some embodiments, passengers may be able to use their PEDs to mirror IFE content streams from media server 202 onto a seatback video display nearby the passenger. For instance, if a passenger is watching a movie on a tablet, then the passenger would be able to instruct IFE distribution unit 212 to concurrently display the movie on the tablet and on a seatback video display. To do so, IFE distribution unit 212 receives a request from a PED (e.g., from PED 316), and may provide the IFE content stream to both PED 316 and the seatback video display that is near the passenger. For instance, IFE distribution unit 212 may also include an electrical connection to seatback video displays. In another embodiment, IFE distribution unit 212 may forward the request to media server 202, which is able to concurrently stream IFE content to both PED 316 and the seatback video display.

FIG. 6 is a block diagram of an IFE content distribution architecture 600 in an exemplary embodiment. In this embodiment, architecture 600 includes a media server 602, which may be similar to media server 202 previously described. Architecture 600 further includes an Ethernet switch 604 that is located forward of aircraft 100, and an Ethernet switch 605 that is located aft of aircraft 100. In this embodiment, media server 602 communicates with Ethernet switches 604-605 over a 10 Gbps connection. Both Ethernet switches 604-605 are electrically coupled with a plurality of IFE distribution units 606-614, which may be similar to IFE distribution unit 212, with the addition of a second Ethernet interface. In this embodiment, IFE distribution units 606-614 each include a pair Ethernet interfaces. The pair of interfaces may be used for redundancy and/or for increasing the available bandwidth between media server 602 and IFE distribution units 606-614. For instance, if Ethernet switch 604 fails, then IFE distribution units 606-614 would still have an Ethernet connection to media server 602 via Ethernet switch 605. When both Ethernet switches 604-605 are available, then the total bandwidth available to IFE distribution units 606-614 in architecture 600 would be 2 Gbps.

In this embodiment, IFE distribution units 606-614 are organized in a column format and are daisy-chained together via Ethernet, with IFE distribution units 606-608 organized in a first column, IFE distribution units 609-611 organized in a second column, and IFE distribution units 612-614 organized in a third column. This column format may correspond to columns of seats or groups of seats onboard aircraft 100. For instance, IFE distribution units 606-614 may provide a plurality of USB ports to a particular seat group, which includes a number of seats. The number of USB ports available at any particular seat may be selected as a matter of design choice.

Although architecture 600 has been illustrated with a particular configuration of Ethernet connections and Ethernet speeds, architecture 600 is not limited to just this particular configuration. Further, the number and relationship of IFE distribution units 606-614 may vary based on a number of seats onboard aircraft 100, a number of seat groups onboard aircraft 100, etc.

Utilizing a USB interface to PEDs, higher data rate IFE content streams can be provided to passengers onboard aircraft 100 than would be possible using Wi-Fi. Further, the IFE system of aircraft may be simplified by removing the typical seatback video unit, since passengers may use their own PEDs to receive the IFE content. This reduces the weight of aircraft 100, thereby saving fuel.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A system comprising:
a media server disposed within an aircraft that is configured to provide In-Flight Entertainment (IFE) content streams to Personal Electronic Devices (PEDs) of passengers;
an Ethernet network that is electrically coupled to the media server; and
a plurality of IFE distribution units that are disposed within the aircraft, wherein at least one IFE distribution unit comprises:
an Ethernet interface electrically coupled to the Ethernet network;
a Universal Serial Bus (USB) port located proximate to a seat within the aircraft; and
a controller electrically coupled to the Ethernet interface and the USB port that is configured to detect that a PED has been connected to the USB port, to receive a request from the PED for an IFE content stream, to convert the request from USB frames to Ethernet frames, and to provide the request to the media server, to receive the IFE content stream from the media server, to convert the IFE content stream from Ethernet frames to USB frames, and to provide the IFE content stream to the PED for presentation on the PED.

2. The system of claim 1 wherein:
the controller is configured to receive a request from the PED to mirror the IFE content stream to a seatback video display that is proximate to the seat, and to provide the IFE content stream to both the PED and the seatback video display.

3. The system of claim 1 wherein:
the controller is configured to receive a request from the PED to mirror the IFE content stream to a seatback video display that is proximate to the seat, and to direct the media server to provide the IFE content stream to both the PED and the seatback video display.

4. The system of claim 1 wherein:
the at least one IFE distribution unit includes a plurality of USB ports; and
the controller is configured to detect that the PED has been connected to one of the USB ports, to associate an identifier with the PED, and to provide the request and the identifier for the PED to the media server.

5. The system of claim 4 wherein:
the controller is configured to receive a plurality of IFE content streams from the media server, to identify one of the IFE content streams based on the identifier for the PED, to convert the identified IFE content stream from Ethernet frames to USB frames, and to provide the identified IFE content stream to the PED utilizing the one of the USB ports.

6. The system of claim 4 wherein:
the media server is configured to receive the request from the at least one IFE distribution unit for the IFE content stream and the identifier, to include the identifier in Ethernet frames for the IFE content stream, and to provide the Ethernet frames for the IFE content stream including the identifier to the at least one IFE distribution unit.

7. The system of claim 1 wherein the Ethernet network comprises:
an Ethernet switch electrically coupling the media server to a plurality of IFE distribution units that are disposed along a column of seats in the aircraft.

8. The system of claim 7 wherein:
the plurality of IFE distribution units disposed along the column are electrically coupled to the Ethernet switch in a daisy chained network configuration.

9. A method operable in an aircraft In-Flight Entertainment (IFE) system for providing IFE content streams to Personal Electronic Devices (PEDs) of passengers, the IFE system comprising a media server disposed within the aircraft, an Ethernet network electrically coupled to the media server, and a plurality of IFE distribution units that are disposed within the aircraft, the method comprising:
detecting, by a controller of an IFE distribution unit, that a PED has been connected to a USB port of the IFE distribution unit that is proximate to a seat in the aircraft;
receiving, by the controller, a request from the PED for an IFE content stream from the media server;
converting, by the controller, the request from USB frames to Ethernet frames;
providing, by the controller, the request to the media server utilizing an Ethernet interface of the IFE distribution unit that is electrically coupled to the Ethernet network;
receiving, by the controller, the IFE content stream from the media server;
converting, by the controller, the IFE content stream from Ethernet frames to USB frames; and
providing, by the controller, the IFE content stream to the PED.

10. The method of claim 9 further comprising:
receiving, by the controller, a request from the PED to mirror the IFE content stream to a seatback video display that is proximate to the seat; and
providing, by the controller, the IFE content stream to both the PED and the seatback video display.

11. The method of claim 9 further comprising:
receiving, by the controller, a request from the PED to mirror the IFE content stream to a seatback video display that is proximate to the seat; and
directing, by the controller, the media server to provide the IFE content stream to both the PED and the seatback video display.

12. The method of claim 9 further comprising:
detecting, by the controller, that the PED has been connected to one of a plurality of USB ports of the IFE distribution unit;
associating, by the controller, an identifier with the PED; and
providing, by the controller, the request and the identifier for the PED to the media server.

13. The method of claim 12 further comprising:
receiving, by the controller, a plurality of IFE content streams from the media server;

identifying, by the controller, one of the IFE content streams based on the identifier for the PED;

converting, by the controller, the identified IFE content stream from Ethernet frames to USB frames; and providing, by the controller, the identified IFE content stream to the PED utilizing the one of the USB ports.

14. The method of claim 13 further comprising:

receiving, by the media server, the request from the IFE distribution unit for the IFE content stream and the identifier;

including, by the media server, the identifier in Ethernet frames for the IFE content stream; and providing, by the media server, the Ethernet frames for the IFE content stream including the identifier to the IFE distribution unit.

15. A system configured to provide In-Flight Entertainment (IFE) content streams to Personal Electronic Devices (PEDs) of passengers, the system comprising:

a media server disposed within an aircraft;

an Ethernet switch disposed within the aircraft having a first Ethernet interface that is electrically coupled to the media server and a plurality of second Ethernet interfaces; and a plurality of IFE distribution units disposed within the aircraft, wherein at least one of the IFE distribution units comprises:

an Ethernet interface electrically coupled to one of the second Ethernet interfaces of the Ethernet switch;

a plurality of Universal Serial Bus (USB) ports located proximate to seats onboard the aircraft that are configured to electrically couple to the PEDs; and a controller electrically coupled to the Ethernet interface and the USB ports that is configured to detect that a PED has been connected to one of the USB ports, to receive a request from the PED for an IFE content stream, to convert the request from USB frames to Ethernet frames, to provide the request to the media server, to receive the IFE content stream from the media server, to convert the IFE content stream from Ethernet frames to USB frames, and to provide the IFE content stream to the PED.

16. The system of claim 15 wherein:

the controller is configured to receive a request from the PED to mirror the IFE content stream to a seatback video display that is proximate to the PED, and to provide the IFE content stream to both the PED and the seatback video display.

\* \* \* \* \*